United States Patent [19]

Rowe

[11] Patent Number: 4,733,738
[45] Date of Patent: Mar. 29, 1988

[54] TRACTOR SPRAY PUMP SUPPORT

[76] Inventor: Neil Rowe, Rte. #1, Box 104, Garwin, Iowa 50632

[21] Appl. No.: 918,311

[22] Filed: Oct. 14, 1986

[51] Int. Cl.⁴ .............................................. B60D 1/08
[52] U.S. Cl. .................................................. 180/53.1
[58] Field of Search .................... 180/53.1, 53.4, 53.5, 180/53.6

[56] References Cited

U.S. PATENT DOCUMENTS

| | | | |
|---|---|---|---|
| 2,469,181 | 5/1949 | Slater | 74/15.6 |
| 2,851,896 | 9/1958 | Ordway | 74/413 |
| 3,153,388 | 10/1964 | Cheely | 417/362 |
| 3,435,778 | 4/1969 | Ascuitto et al. | 74/15.63 |
| 3,717,045 | 2/1973 | Burenga | 74/15.6 |
| 4,138,079 | 2/1979 | Ehret | 248/558 |
| 4,184,558 | 1/1980 | Buhr | 180/53.1 |
| 4,336,627 | 6/1982 | Bascus | 180/53.1 |
| 4,600,070 | 7/1986 | Thurner | 180/53.1 |

Primary Examiner—Richard A. Bertsch
Attorney, Agent, or Firm—Zarley McKee, Thomte, Voorhees & Sease

[57] ABSTRACT

A spray pump support is mounted directly to the tractor and includes a rearwardly extending leg positioned below the power takeoff shaft of the tractor and extends beyond the rear end of the PTO shaft. A spray pump is mounted to the rear end of the horizontal member of the support. The support may comprise two L-shaped members with overlapping horizontal legs or oppositely disposed side legs may connect the support to rearwardly extending tractor frame portions. A further alternate is one piece and includes upstanding front and rear legs for mounting the support to the tractor and the pump. Another embodiment is one piece and L-shaped with the horizontal leg extending beyond the rear end of the PTO shaft for mounting the pump directly thereto.

9 Claims, 12 Drawing Figures

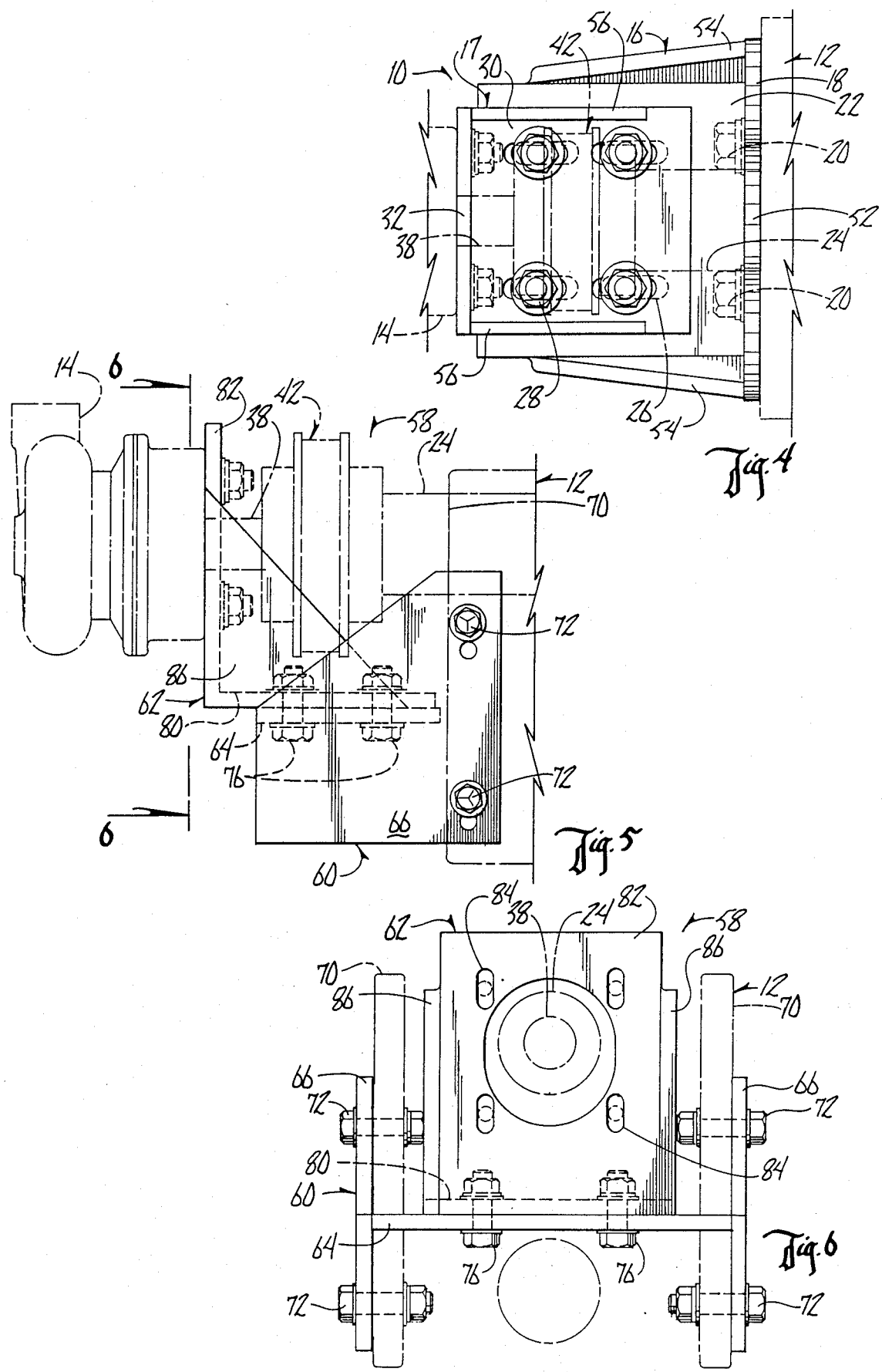

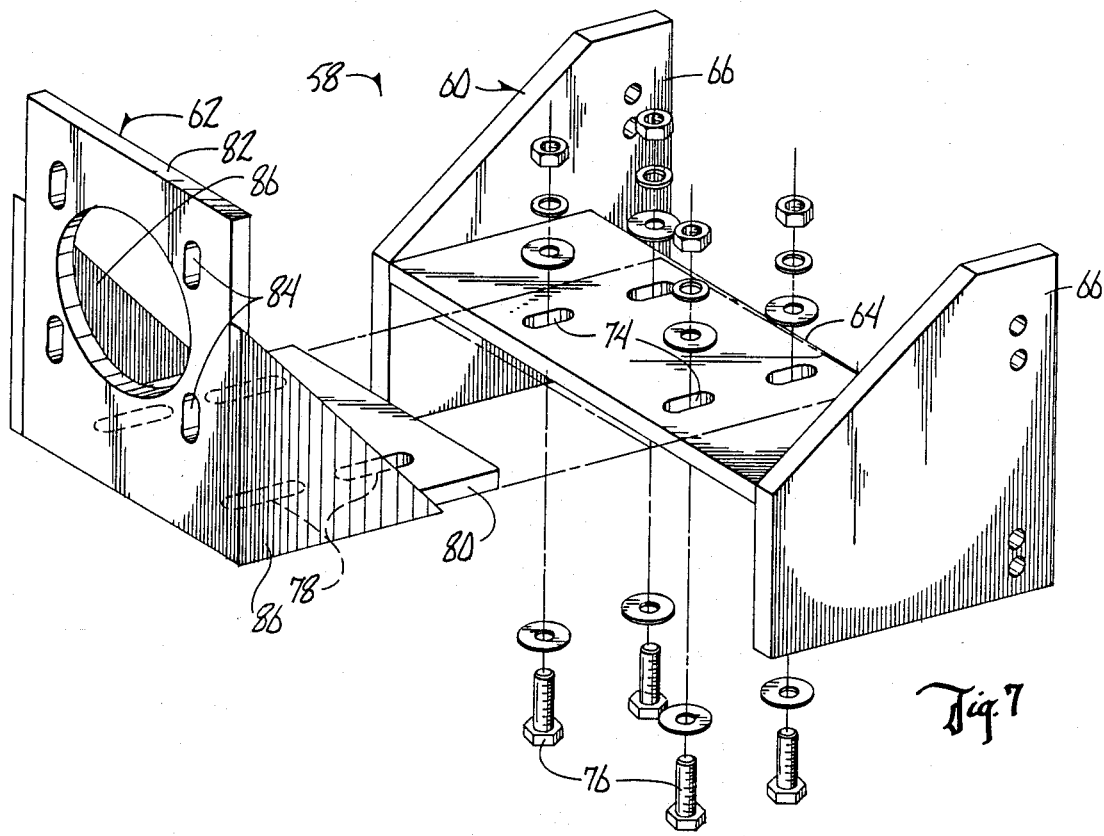
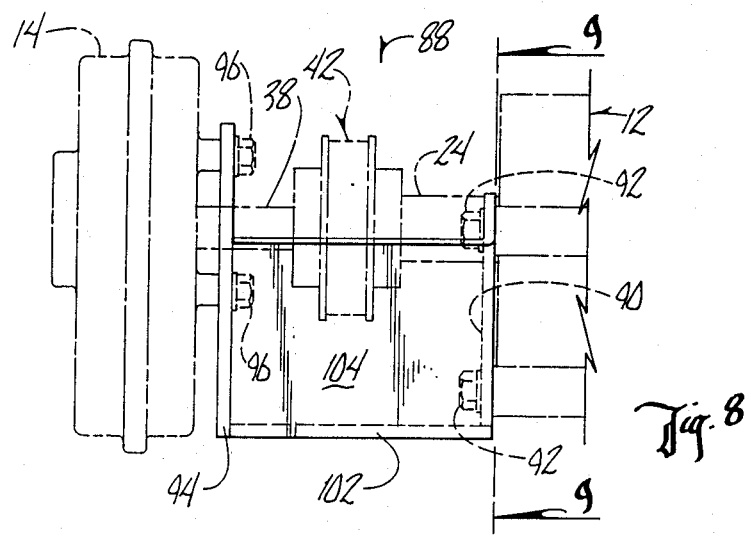

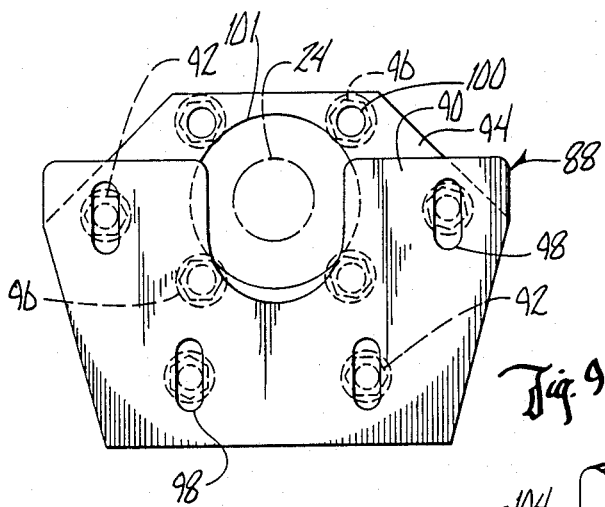
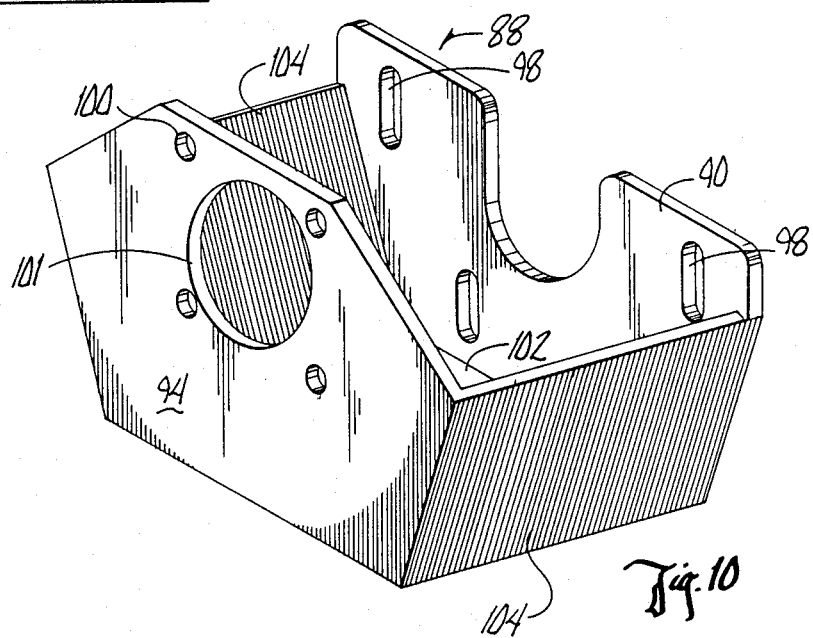
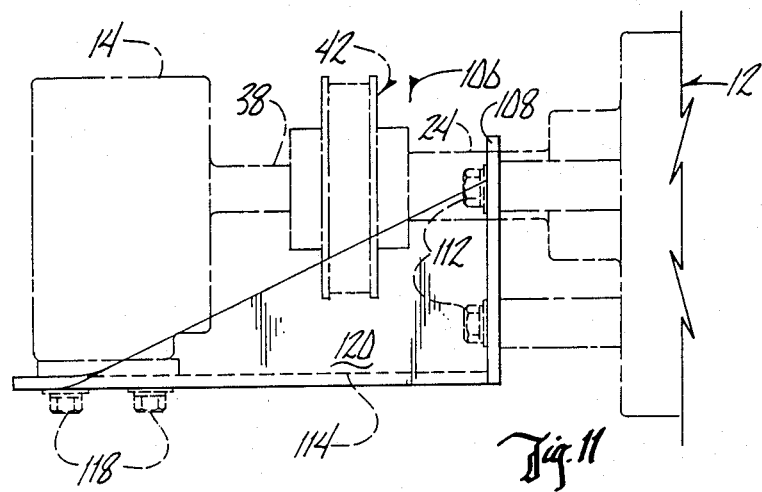

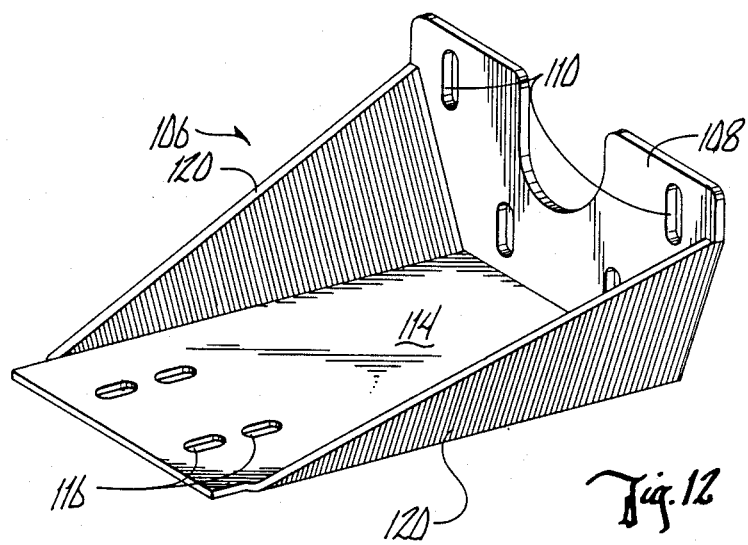

TRACTOR SPRAY PUMP SUPPORT

BACKGROUND OF THE INVENTION

Spray pumps driven by the power takeoff shaft (PTO) of a tractor also depend for their support on the PTO shaft. Means may be provided for preventing the pump from rotating as the PTO shaft turns. Operation of the pump at low speeds may not present a problem, however, at speeds of 1000 r.p.m. the lack of support independently of the PTO shaft taken with vibrations which develop at these speeds will quickly destroy the bearing in the pump and in some cases the bearings for the PTO shaft itself. The support for the pump needs to be solid and allow for perfect alignment between the shaft of the pump and the PTO shaft.

SUMMARY OF THE INVENTION

The sprayer pump support of this invention is mounted under the PTO shaft and directly to the tractor frame and extends rearwardly beyond the end of the PTO shaft. The pump then is mounted on the rear end of the support bracket. The mounting bolts connecting the bracket to the tractor and/or the bolts connecting the pump to the bracket are provided with adjustment slots to allow perfect alignment with the PTO shaft.

Several embodiments of the support bracket are disclosed. One embodiment has two L-shaped bracket portions with horizontally disposed overlapping leg portions with oppositely disposed upstanding vertical legs. One of the legs is attached to the tractor below and around the PTO shaft while the other leg provides a mounting support for the pump. Adjustments are provided at the connection between the horizontal leg portions and at the tractor and at the pump.

The second embodiment includes the horizontal leg extending under the PTO shaft but includes oppositely disposed side vertical members connected to oppositely disposed rearwardly extending vertical frame members on the tractor. A L-shaped pump bracket portion then through a horizontal leg portion connects to the horizontal leg of the tractor mounted bracket portion and the vertical leg of the pump bracket portion adjustably supports the pump.

The third embodiment includes an integral structure having oppositely disposed front and rear vertical plate portions, side wall portions, and a bottom wall.

A fourth embodiment is L-shaped with the forward vertical leg being mounted to the tractor frame and with the horizontal leg portion extending under the PTO shaft and therebeyond for supporting a pump directly thereon.

The support brackets of this invention will provide for a solid support for the pump at all speeds of operation and allow for easily aligning the pump shaft with the PTO shaft. All strain is taken off of the bearings for the pump and the PTO shaft.

DESCRIPTION OF THE DRAWINGS

FIG. 4 is a fragmentary top-plan view thereof.

FIG. 5 is a fragmentary side elevational view of a sprayer pump support alternate embodiment for connection to tractors having oppositely disposed rearwardly extending frame portions for mounting the support.

FIG. 6 is an elevational view taken along line 6—6 in FIG. 5.

FIG. 7 is an exploded perspective view thereof.

FIG. 8 is a fragmentary side elevational view of a third embodiment wherein the support is a one-piece structure.

FIG. 9 is an end elevational view taken along line 9—9 in FIG. 8.

FIG. 10 is a perspective view thereof.

FIG. 11 is a fragmentary side elevational view of a fourth embodiment wherein the pump is mounted directly to the rearwardly extending horizontal leg of the L-shaped support.

FIG. 12 is a perspective view thereof.

DETAILED DESCRIPTION OF INVENTION

Figure 1:
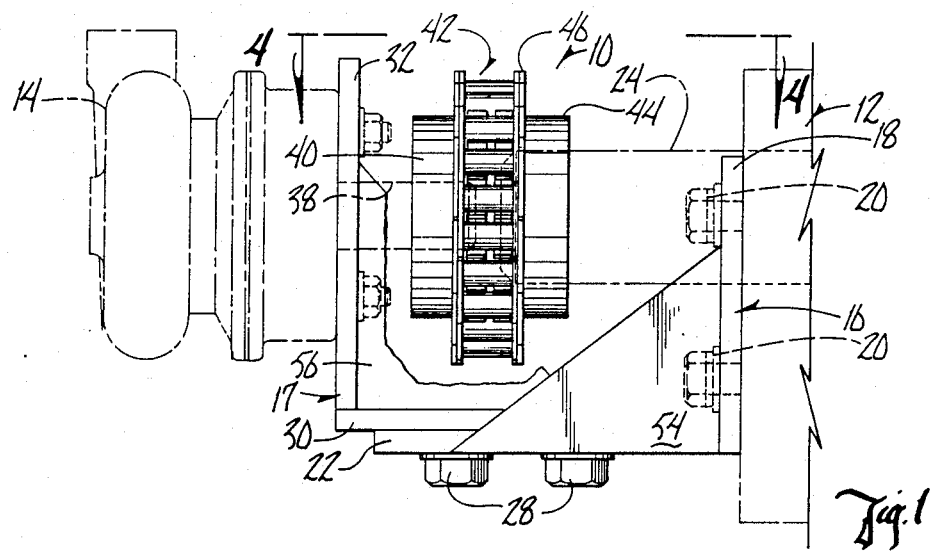
FIG. 1 is a fragmentary side elevational view of a pump support bracket mounted on a tractor and supporting a spray pump.
Figure 2:
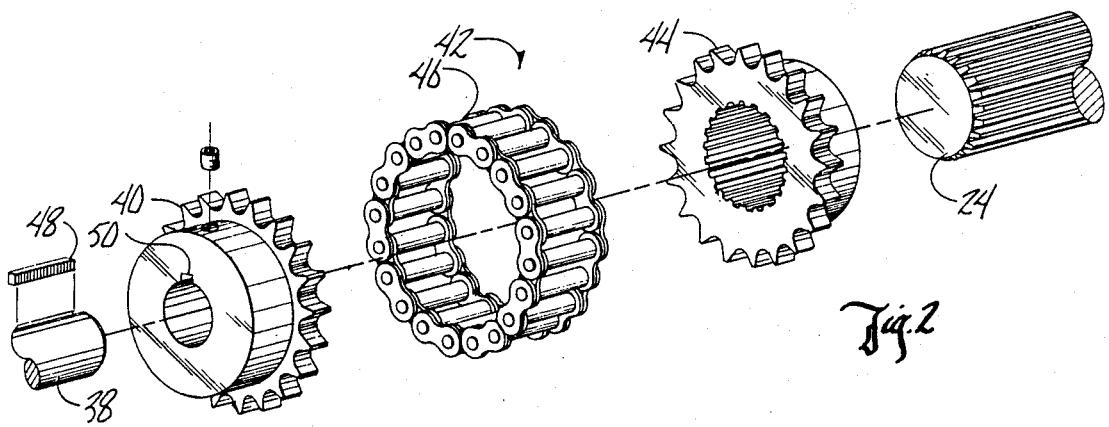
FIG. 2 is an exploded perspective view of the chain coupler connection between the PTO shaft and the spray pump shaft.
Figure 3:
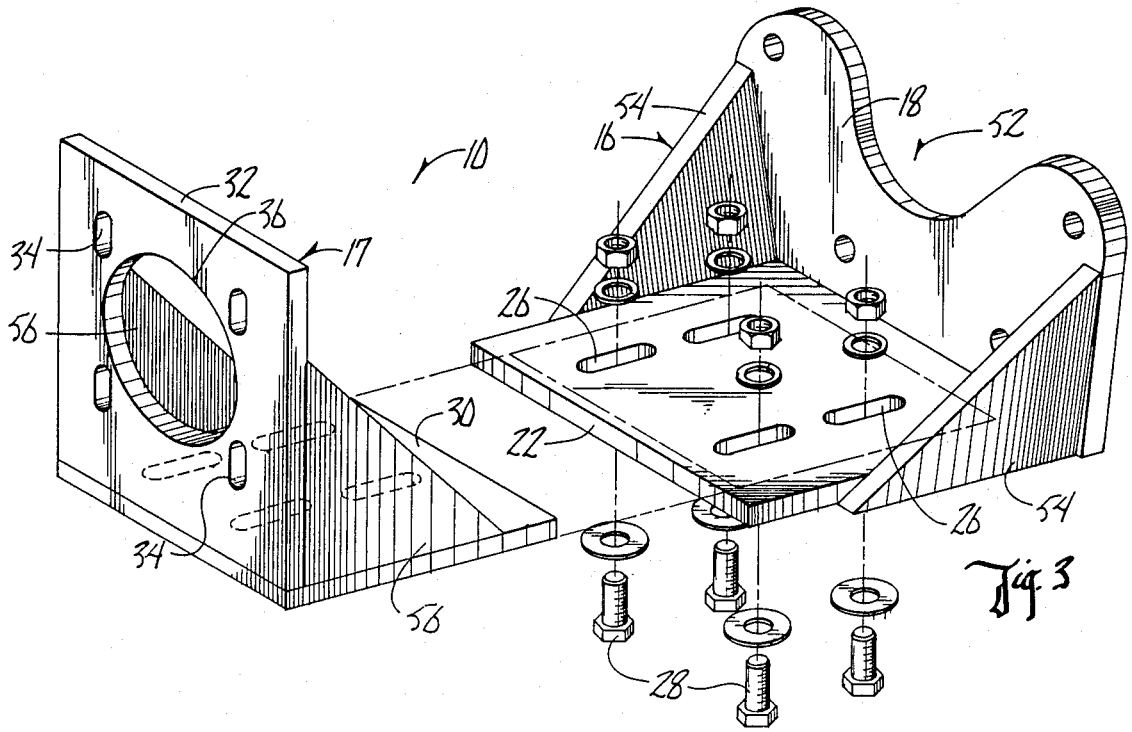
FIG. 3 is an exploded perspective view of the pump support.

The pump support bracket of FIG. 1-4 is referred to in FIG. 1 generally by the reference numeral 10. The bracket 10 is mounted to a tractor 12 and supports a pump 14.

The bracket 10 includes two L-shaped members 16 and 17. The member 16 includes an upstanding vertical leg 18 connected to the tractor frame 12 by bolts 20. A horizontal leg 22 extends rearwardly under the tractor PTO shaft 24 and includes elongated slots 26 through which bolts 28 extend for adjustably connecting a horizontal leg 30 of the L-shaped pump support member 17. The member 17 includes an upstanding vertical leg 32 to which the pump 14 is mounted by bolts 34 extending through vertically oriented slots 34 in the leg 32. A center opening 36 accommodates the pump shaft 38 which is received in a gear 40 of a chain coupler 42 which connects to a gear 44 on the PTO shaft 24. The two gears 40 and 44 are connected together by a roller chain 46. A key 48 on the pump shaft 38 is received in a slot 50 in the gear 40.

It is thus seen that the PTO shaft 24 is cradled in a U-shaped recess 52 in the vertical leg 18. Rearwardly extending oppositely disposed side plates 54 rigidify the vertical leg 18 to the horizontal leg 22. Similarly, triangular shaped side plates 56 connect the horizontal leg 30 to the vertical leg 32.

A second embodiment is shown in FIGS. 5-7 and is referred to generally by the reference numeral 58. The support 58 includes a bracket 60 connected to the tractor 12 and a bracket 62 supporting the pump 14. The bracket 60 has a transversely extending horizontal leg 64 with upstanding oppositely disposed legs 66 at opposite ends bolted to the tractor rearwardly extending frame portions 70 by bolts 72. Elongated slots 74 are provided in the horizontal leg 64 to receive bolts 76 which also extend through slots 78 in the horizontally disposed leg 80 of the bracket 62 thereby allowing for complete adjustability between the brackets 60 and 62. The bracket 62 also includes an upstanding leg 82 to which the pump 14 is mounted through vertically elongated slots 84 in the leg 82. Side reinforcement plates 86 triangular in shape extend between the legs 80 and 82. It is thus seen that complete adjustability of the support to the tractor and the pump to the support and to the tractor PTO shaft 24 is readily possible utilizing the support 58.

A third embodiment of the pump support is shown in FIGS. 8–10 and is referred to generally by the reference numeral 88. This support is an integral one-piece structure having an upstanding front leg 90 connected to the tractor frame 12 by bolts 92 and oppositely disposed upstanding rear leg 94 for supporting the pump 14 through bolts 96. Elongated vertically arranged slots 98 are provided in the front leg 90 for adjustably mounting the support to the tractor while holes 100 in the rear leg 94 mount the pump to the leg 94. A central opening 101 is provided in the leg 94 for the pump shaft 38 to extend into the center of the support for engagement with the chain coupler 42.

A bottom wall 102 is provided along with oppositely disposed upwardly extending and outwardly flaring side walls 104 which complete the unitary basket-like support structure 88.

A fourth embodiment of the pump support is shown in FIGS. 11 and 12 and is referred to generally by the reference numeral 106. This support is also totally integral and includes a front leg 108 having vertically arranged slots 110 for receiving bolts 112 for mounting the support to the tractor 12. The horizontally disposed rearwardly extending leg 114 includes elongated slots 116 for adjustably mounting the pump 14 by bolts 118. Oppositely laterally disposed triangular shaped side walls 120 extend between the vertical leg 108 and the horizontal leg 114.

It is thus seen that with each of the embodiments of this invention that the pump 14 is solidly mounted to the tractor 12 by all of the supports which extend under the PTO shaft 24. Different tractors and different spray pumps require different supports but basic to each of these supports is the ease of aligning the pump shaft 38 with the chain coupler 42 and in turn with the PTO shaft 24 and solidly mounting the pump 14 through the pump support to the tractor such that there is no movement of the pump 14 relative to the tractor which would cause stress on the pump bearings and on the tractor bearings at speed on the order of 1000 r.p.m.

I claim:

1. A tractor spray pump support comprising,
   a tractor having a PTO shaft extending rearwardly from the tractor frame,
   a pump support bracket extending below said PTO shaft and connected to said tractor frame, said bracket extending beyond the outer end of said PTO shaft and providing a pump support,
   a spray pump mounted on said pump support and having a forwardly extending shaft,
   a coupling means interconnecting said PTO and pump shaft, and
   said pump support bracket including two L-shaped members having overlapping horizontally extending legs and oppositely disposed upstanding legs, the upstanding leg of one of said members being secured to said tractor frame, and the upstanding leg of said other L-shaped member being connected to and supporting said spray pump.

2. The structure of claim 1 wherein said horizontally extending legs are adjustably interconnected for positioning said pump shaft in alignment with said PTO shaft.

3. The structure of claim 2 wherein said upstanding leg secured to said tractor includes a center opening through which said PTO shaft extends.

4. The structure of claim 2 wherein said upstanding leg connected to said pump includes a center opening through which said pump shaft extends.

5. A tractor spray pump support comprising,
   a tractor having a PTO shaft extending rearwardly from the tractor frame,
   a pump support bracket extending below said PTO shaft and connected to said tractor frame, said bracket extending beyond the outer end of said PTO shaft and providing a pump support,
   a spray pump mounted on said pump support and having a forwardly extending shaft,
   a coupling means interconnecting said PTO and pump shaft, and
   said bracket extending below said PTO shaft including overlapping horizontally extending adjustably interconnected leg members and the outermost of said leg members having an upstanding leg member to which said pump is secured.

6. The structure of claim 5 wherein the innermost horizontally extending leg portion is connected to lateral oppositely disposed vertical members connected to oppositely disposed rearwardly extending vertical frame members on said tractor.

7. A tractor spray pump support comprising,
   a tractor having a PTO shaft extending rearwardly from the tractor frame,
   a pump support bracket extending below said PTO shaft and connected to said tractor frame, said bracket extending beyond the outer end of said PTO shaft and providing a pump support,
   a spray pump mounted on said pump support and having a forwardly extending shaft,
   a coupling means interconnecting said PTO and pump shaft, and
   said pump support bracket including oppositely disposed front and rear upstanding transversely extending members, said front member being connected to said tractor frame and said rear member being connected to said pump, said front and rear members being interconnected by a pair of oppositely disposed upstanding side walls and a horizontally oriented bottom wall connected to said front and rear members and said oppositely disposed side walls.

8. A tractor spray pump support comprising,
   a tractor having a PTO shaft extending rearwardly from the tractor frame,
   a pump support bracket extending below said PTO shaft and connected to said tractor frame, said bracket extending beyond the outer end of said PTO shaft and providing a pump support,
   a spray pump mounted on said pump support and having a forwardly extending shaft,
   a coupling means interconnecting said PTO and pump shaft, and
   said pump support bracket including an upstanding transversely extending vertical wall connected to said tractor frame and a rearwardly extending horizontal wall extending below said PTO shaft and said pump shaft, said pump being mounted directly to the outer end of said horizontal wall.

9. The structure of claim 8 wherein oppositely disposed vertical side walls extend rearwardly along said horizontal wall from said vertical wall connected to said tractor frame, and said side walls taper downwardly from adjacent the top of said tractor mounted vertical wall to the horizontal wall at its outer end.

* * * * *